United States Patent [19]

Weiss et al.

[11] 4,011,751

[45] Mar. 15, 1977

[54] BRAKE TESTER

[75] Inventors: Arnold A. Weiss, Minneapolis; Daniel M. Motl, New Brighton; Eugene D. Johnston, St. Paul, all of Minn.

[73] Assignee: Applied Power Inc., Milwaukee, Wis.

[22] Filed: Feb. 27, 1976

[21] Appl. No.: 662,018

[52] U.S. Cl. .................................................. 73/122
[51] Int. Cl.² ........................................... G01L 5/28
[58] Field of Search ...................... 73/122, 125, 121

[56] References Cited

UNITED STATES PATENTS

| | | | |
|---|---|---|---|
| 2,203,136 | 6/1940 | Fowler | 73/122 |
| 2,664,745 | 1/1954 | Merrill et al. | 73/122 |

*Primary Examiner*—Jerry W. Myracle
*Attorney, Agent, or Firm*—Frederick E. Lange

[57] ABSTRACT

Vehicle brake testing apparatus of the type in which there are yieldable restrained pairs of tread plates engaging the front wheels and rear wheels of a vehicle in which there is means for producing an electrical signal depending in value upon the braking force on each wheel, means for producing a total braking force signal depending upon the sums of the signals, means for measuring the speed of the vehicle as it is driven onto the tread plates and producing an electrical speed signal, means for dividing the integrated total force signal by the speed signal to obtain a weight signal indicative of the weight of the vehicle and means for comparing the total force signal with the weight signal to obtain an indication of the ratio between the total braking force and the weight of the vehicle and indicating whether this ratio meets acceptable standards. The apparatus employs digital processing equipment with means for converting the analog signals resulting from actuation of the tread plates to digital signals and computing means for computing the values of various relations between the values of the various digital signals and displaying these relationships. Among the relations which are displayed are the value of the ratio between the difference in the front wheel braking signals and the the front wheel braking signal which is the maximum of the two braking signals. Another ratio which is displayed is the same ratio in connection with the rear wheel braking signals. Another ratio which is computed and displayed is the value of the relation between the total of the front wheel braking signals and the total of the braking signals of all four wheels.

10 Claims, 7 Drawing Figures

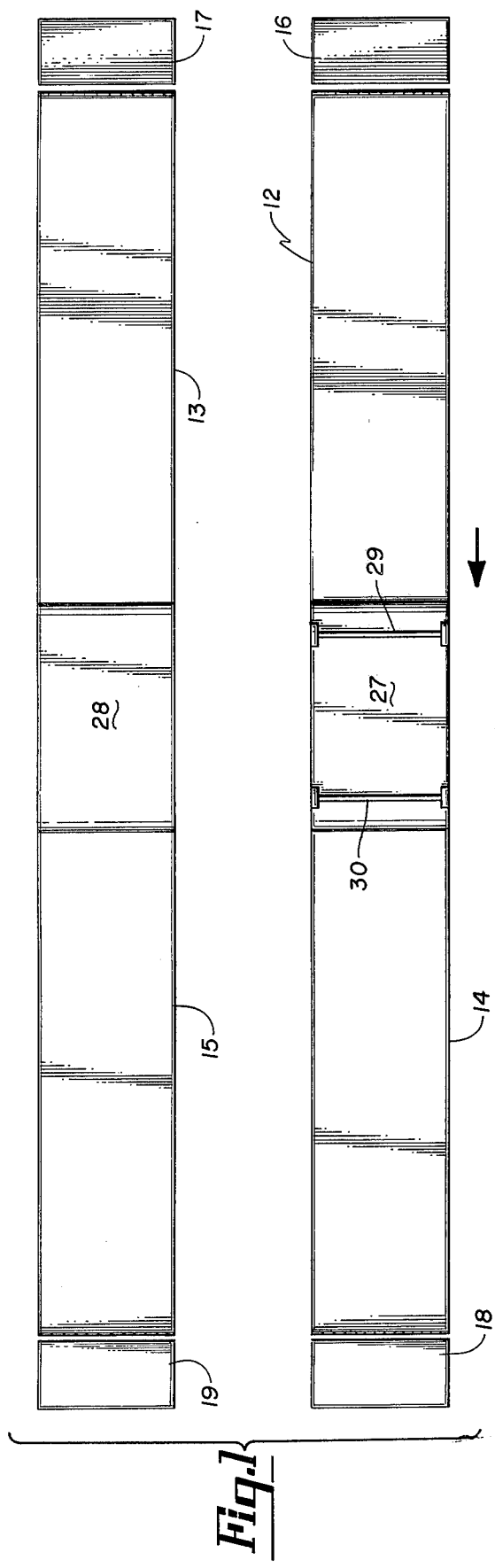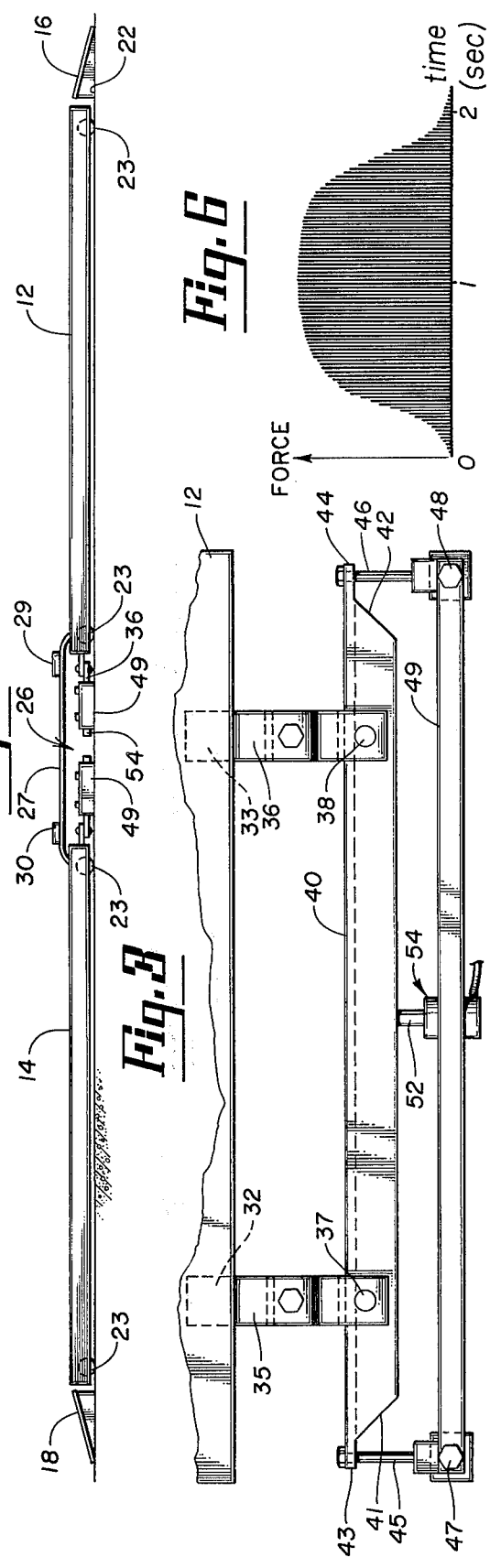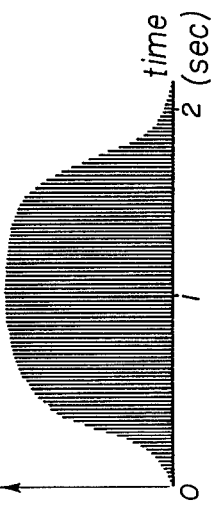

Fig. 4
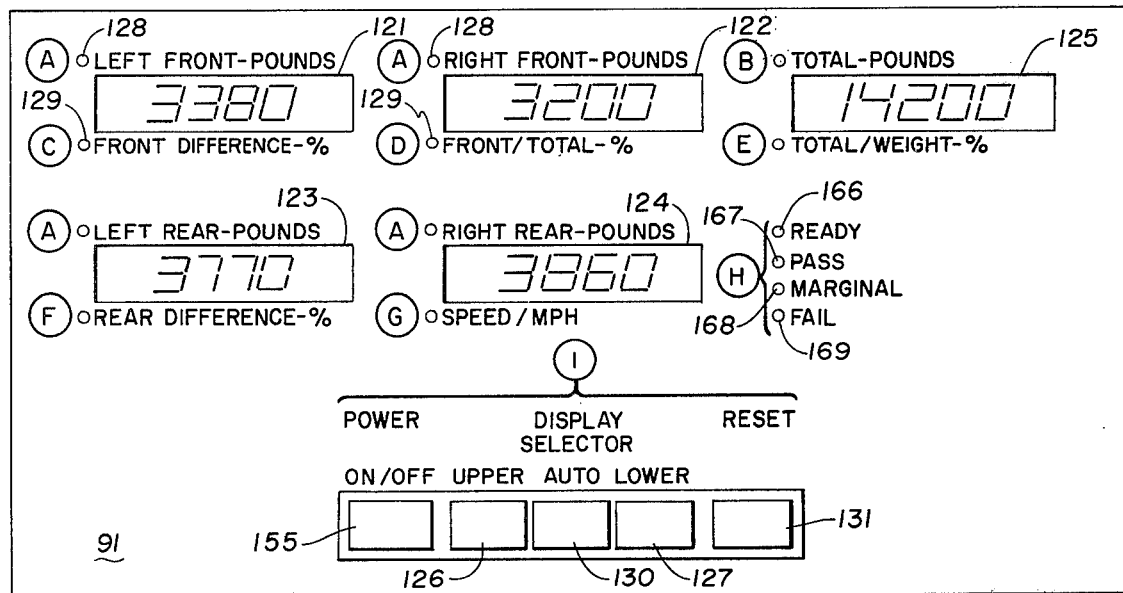
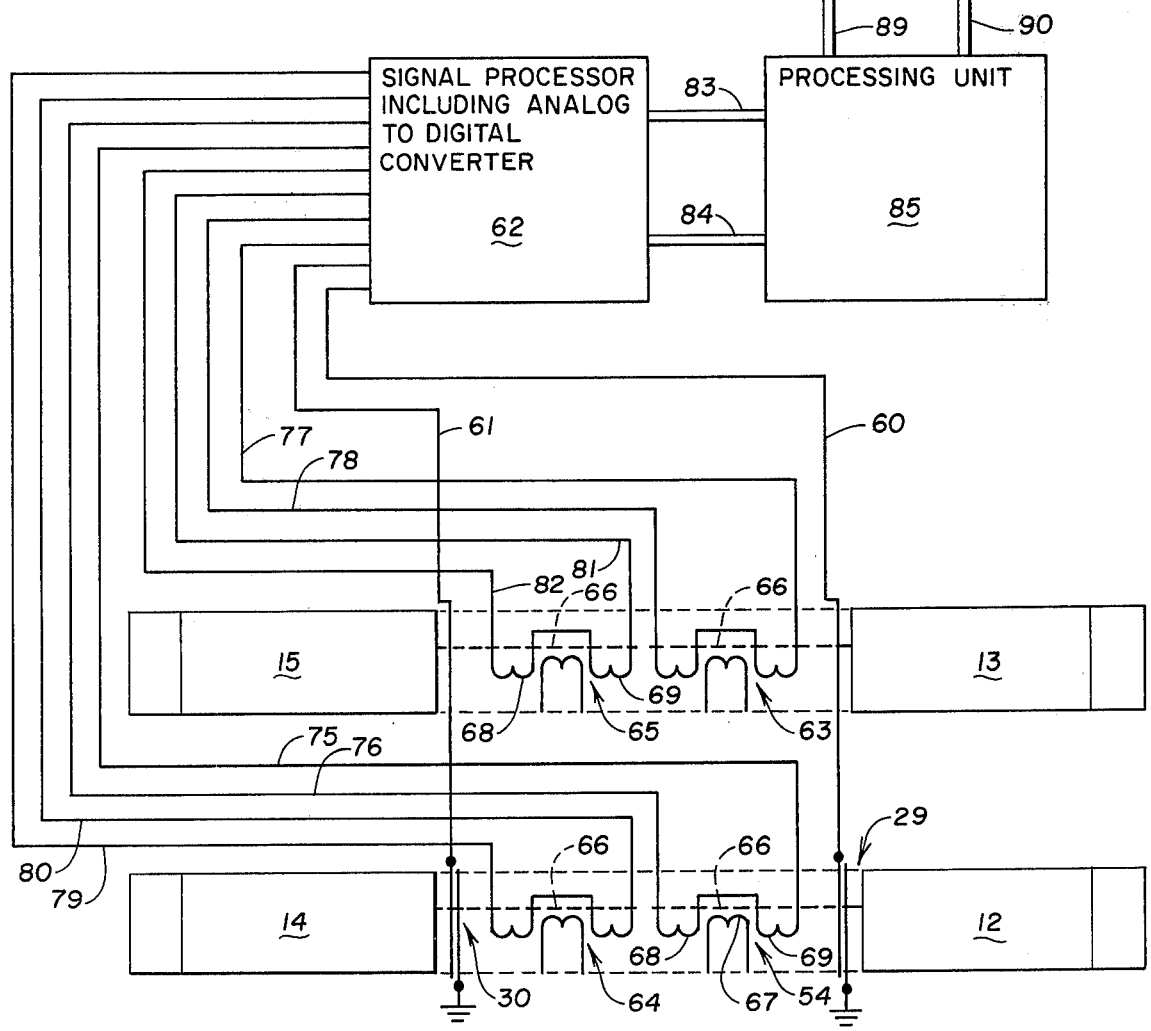

BRAKE TESTER

BACKGROUND OF THE INVENTION

It is very old to provide means for testing the brakes of an automotive vehicle by providing tread plates, one for each wheel of the automotive vehicle and resiliently restraining these tread plates against longitudinal movement so that any movement that does take place is dependent upon the braking force existing as a result of the application of the brakes while the vehicle is moving over the tread plates. This movement of the tread plates is used to indicate the effectiveness of the brakes for each wheel. This may be done by the use of some form of transducer which supplies a signal to some indicating device on a central pedestal. Often, this transducer takes the form of a hydraulic control. On the other hand, it is also old to use an electrical transducer. Normally, the individual transducers are employed to indicate the braking force at each wheel. It is also old to sum the effects of the various transducers to produce an indication of the total braking force that is available.

In order to evaluate the adequancy of the total braking force available, it is necessary to compare this with the weight of the vehicle. Obviously, the heavier the vehicle and its load, the greater is the braking force that is needed to stop the vehicle properly. Unfortunately, it has been very difficult in the past to accurately determine the weight of the vehcile unless the vehicle is first driven on to scales designed for that purpose. This is not suitable where the testing must be done in a relatively small area. Furthermore, it involves two different steps and the correlation of the weight as determined by the weighing mechanism with the braking force as determined by the brake tester. In addition, where the transducer is a hydraulic one, this involves the use of hydraulic lines between the transducer which must normally be close to the tread plate and the indicating pedestal. There is also some delay introduced by reason of the action of the hydraulic system. Even where an electrical transducer has been used, the system employed is normally one using analog signals and the amount of arithmetical functions which may readily be performed are limited.

SUMMARY OF THE PRESENT INVENTION

The present invention is concerned with vehicle brake testing apparatus of the type employing movable tread plates and means connected to each tread plate for producing an electrical signal dependent in value upon the braking force of the wheel engaging the tread plate and in which there is means for summing the electrical signals to obtain the total braking force. This total braking force is then integrated over a major portion of its duration and divided by a velocity signal obtained by a separate velocity measuring device so that a weight signal indicative of the weight of the vehicle is obtained as part of the operation of the brake testing apparatus.

The apparatus further has means for comparing the total force signal with the weight signal obtained as indicated above to obtain an indication of the ratio between the total braking force and the weight of the vehicle. The pairs of tread plates associated with the front and rear wheels, respectively, are preferably spaced apart and speed measuring apparatus is located in this intermediate area between the two pairs of tread plates.

The computing means has stored therein the accepted standard between the total braking force and the weight of the vehicle and the apparatus is designed to indicate whether the actual ratio is below the standard ratio.

The apparatus also has means for converting the analog signals to corresponding digital signals, digital computing means for computing the values of various relations between the corresponding digital signals, digital display means having electronic display elements, and means selectively energizing the display elements to indicate digitally the values of the various relations.

One of the ratios which is determined and indicated is the ratio between the difference in the front wheel braking signals produced by actuation of the tread plates of the front wheels and the magnitude of one of the front wheel braking signals, preferably the maximum of the two front wheel braking signals. The apparatus is likewise designed to measure the same ratio in connection with the rear wheel braking signals.

The apparatus is also designed to indicate the ratio between the total front wheel braking force and the total braking force on all four wheels.

Various other objects and features of the present invention will be apparent from a consideration of the accompanying specification, claims and drawing.

BRIEF DESCRIPTION OF THE DRAWINGS

FIG. 1 is a top plan view of the tread plates of the vehicle brake testing apparatus;

FIG. 2 is an elevational view showing two of the tread plates and apparatus associated therewith;

FIG. 3 is a fragmentary view on a much larger scale than FIGS. 1 and 2 showing the mechanism for actuating the electrical transducer in response to the application of a braking force to one of the tread plates;

FIG. 4 is a schematic representation of the entire system showing portions of the apparatus in block diagram form;

FIG. 6 is a representation of a typical wave form of the braking force after the braking signal has been processed by certain of the apparatus.

DESCRIPTION OF THE PREFERRED EMBODIMENT

Figure 5A:
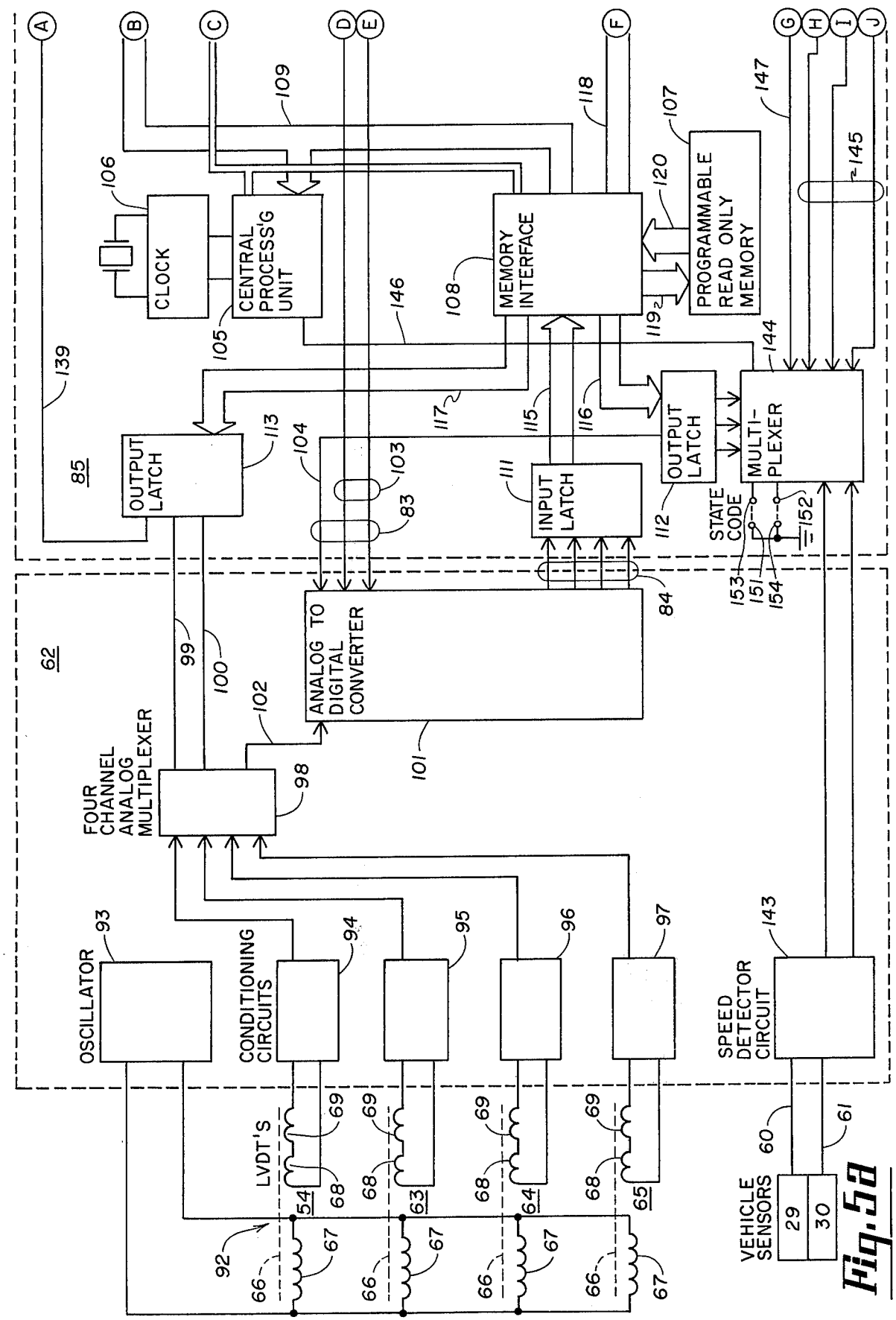
FIGS. 5a and 5b are collectively a logical block diagram showing the details of the signal processor, the processing unit and the display subsystem.

Referring to FIGS. 1 and 2, there are four tread plates 12, 13, 14 and 15. The tread plates 12 and 13 are employed to measure the braking force on the rear wheels while the tread plates 14 and 15 are employed to measure the braking force on the front wheels. Secured adjacent tread 12 and 13 are ramp plates 16 and 17. Similarly, ramp plates 18 and 19 are secured adjacent tread plates 14 and 15. The purpose of the ramp plates 16, 17, 18 and 19 is to enable the vehicle wheels to pass readily on to and off the tread plates 12 through 15. The ramp plates 16, 17, 18 and 19 rest upon the floor 22 of the building in which the brake tester is located and are supported close to the tread plates by blocks underneath the ramp plates.

The tread plates 12, 13, 14 and 15 are movably mounted with respect to the floor 22. In FIG. 2, rollers 23 are shown as supporting tread plates 12 and 14. It is to be understood that similar means would be employed under tread plates 13 and 15. Any other suitable means for supporting the tread plates 12 and 14 so that they are slidable with respect to the floor 22 can be employed.

It is to be noted that rear tread plates 12 and 13 are substantially spaced from the front tread plates 14 and 15 to provide an intermediate space 26. The various force sensing equipment is located in this space, as will be presently explained. The area 26 between plates 12 and 14 and the similar area between plates 13 and 15 are covered by cover plates 27 and 28, respectively. These cover plates are detachably secured to the floor 22 by any suitable fastening means, not shown. They provide a continuation of the driving surface between the tread plates 12 and 14 on the one hand and tread plates 13 and 15 on the other hand.

Mounted on cover plate 27 between tread plates 12 and 14 are a pair of impact sensing devices 29 and 30. These are spaced a predetermined distance apart and are each designed to produce an electrical signal when a vehicle wheel passes thereover. These impact sensing devices may take any of several forms. For example, they may be tape conductors of the type having two adjacent conductors extending the full length thereof and which are designed to be brought into electrical contact upon pressure being applied to the sensor. On the other hand, they may also take the form of a closed hollow tube which is connected at its end to an electrical transducer actuated by a change in pressure as a result of a vehicle passing over the tube and compressing the same. Such devices are old and well known and have been employed for both traffic counting and for determining the speed of a vehicle along the highway. As far as the present invention is concerned, these sensing devices may be any form of device which upon a vehicle passing thereover will produce an electrical signal.

It will be obvious that as the vehicle is driven first over the tread plates 12 and 13 and then over the plates 27 and 28, the vehicle will first engage the sensor 29 and then the sensor 30. The difference in time of the engagement of the vehicle wheel with sensors 29 and 30 will, of course, be a measurement of the speed of the vehicle. The apparatus of the present invention is designed to measure this speed, display it and utilize it in connection with various tests being performed, as will be described later.

Referring now to FIG. 3, there is shown the mechanism by which the force exerted upon plates 12, 13, 14 and 15 is converted into electrical signals. It is to be understood that in an ordinary brake testing operation, the vehicle is driven on to the tread plates with the front wheels engaging tread plates 14 and 15 and the rear wheels engaging tread plates 12 and 13. The operator then suddenly engages the brakes to stop the vehicle. A substantial force will be exerted upon each of the tread plates which, as pointed out above, are movably mounted with respect to the floor 22. This force will be in the direction of the arrow adjacent FIG. 1 which arrow is in the direction of the movement of the vehicle prior to its being stopped.

Associated with each of the tread plates 12, 13, 14, and 15 is a separate means for measuring the amount of this force. The means for measuring the force in connection with tread plate 12 is specifically shown in FIG. 3. Rigidly secured to tread plate 12 as by weldings are two plates 32 and 33. Bolted to the plates 32 and 33 are two bifurcated link members 35 and 36. These link members are rigidly fastened to plates 32 and 33, respectively. Link members 35 and 36 are in turn fastened to an elastic cross bar 40 by suitable pivotal fastening means 37 and 38. The elastic cross bar 40 is a metallic beam which is designed to be deflected upon a force being applied thereto by links 35 and 36 from the tread plate 12. The amount of deflection of the metallic elastic beam 40 is designed to be within the elastic limit of the beam so that the movement of the center portion of the beam is proportional to the force exerted upon tread plate 12. In order to facilitate the deflection of the beam 40, the end portions thereof are cut away diagonally at 41 and 42 to provide two ears 43 and 44. These ears are rigidly secured to bolts 45 and 46. The bolts 45 and 46 may threadedly extend through the ears 43 and 44 so as to be longitudinally immovable with respect thereto. The bolts 45 and 46 are in turn secured through rigid fastening means 47 and 48 to a beam 49 which is fixed to the floor 22 in any suitable manner. The beam 49 has secured thereto the housing of a linear variable differential transformer, often referred to as an LVDT. This linear variable differential transformer 54 is secured in the beam 49 against movement therewith. As will be presently explained, this LVDT has a movable core which, upon being deflected from a normal position, produces an output signal of one phase or the other. The movable core has associated therewith a plunger 52 which is biased into engagement with the elastic bar 40. As brakes are applied to the wheels on the tread plates 12 and 13 with the vehicle moving in the direction shown in the arrow, it will be obvious that a longitudinal force is applied to the tread plates with the result that a downward force, as viewed in FIG. 3, is applied to beam 40 to cause it to deflect downwardly. This will in turn move plunger 52 downwardly to correspondingly move the core of the LVDT. It will be noted that in the case of tread plates 14 and 15 the direction of movement will be opposite with respect to the LVDT than that which has just been described. In other words, referring to FIG. 2, it will be noted that the tread plates tend to move away from the bar 49 carrying the associated LVDT. This will still result in a signal, however, because the bias of the plunger 52 will cause this plunger to tend to maintain itself always in engagement with the elastic bar 40 and to assume the position that the elastic bar 40 assumes regardless of the direction of deflection of the same.

Referring now to FIG. 4, there is shown a broad schematic representation of the brake tester of the present invention. In the lower portion of the figure, the four tread plates 12, 13, 14 and 15 are shown in somewhat schematic form. The two sensors 29 and 30 for determining the speed of the vehicle are each shown as comprising two parallel conductors, one of which is grounded. The conductors of these sensing units are brought into contact with each other upon a vehicle passing over them. As pointed out above, it is also possible to use a closed tube which in turn actuates a pressure sensitive switch. The sensors 29 and 30 are connected through conductors 60 and 61 to the input of a signal processor 62. This signal processor, as will be explained later, includes an analog to digital converter and a microporgrammed digital computer to convert the analog signals produced by the various LVDT's to digital outputs and to process this data in a desired fashion.

In addition to the LVDT 54 previously referred to, there are also similar LVDT's 63, 64 and 65. Each of these LVDT's comprises a movable core indicated by the dash lines 66. In the case of the LVDT 54, this movable core 66 is the one which is connected to the actuator plunger 52. In addition, each LVDT has a primary winding 67 and a pair of opposed secondary windings 68 and 69. Each core 66 is designed to be connected to the elastic bar member 40 associated with the corresponding one of the tread plates. In other words, as has previously been described, core 66 of LVDT 54 is moved in accordance with the movement of tread plate 12. The core 66 of LVDT 63 is moved in accordance with the movement of plate 13. The core 66 of LVDT 64 is actuated in accordance with the movement of tread plate 14 and the core 66 of LVDT 65 is actuated in accordance with the movement of tread plate 15. As will be described later, the primary windings 67 of the LVDT's 54, 63, 64 and 65 are connected in parallel to the output of a sinusoidal oscillator which may, for example be designed to produce an oscillating signal at a rate of 2500 Hz. The energization of the primary windings results in a voltage being developed across the output terminals of windings 68 and 69, the amplitude of which is a direct function of the displacement of cores 66 which in turn is related to the amount of force exerted upon the various tread plates 12, 13, 14 and 15.

The output from each of the LVDT's is coupled to the signal processor 62. In the case of output windings 68 and 69 of LVDT 54, the terminals of these windings are connected through conductors 75 and 76 to processor 62. The corresponding windings of LVDT 63 are connected through conductors 77 and 78 to processor 62. Similarly, the output windings of LVDT's 64 and 65 are connected by conductors 79 and 80 and by conductors 81 and 82, respectively, to converter 62. As will be explained later, various steps are performed in the signal processor 62 including the analog signals to digital signals. Converter 62 is connected through a control cable 83 and a processing cable 84 to a microprocessor 85. The processing unit performs various logic operations and arithmetical computations. The processing unit 85 is connected through a display data cable 89 and a mode selecting cable 90 to a display module 91 having a display panel. Only the display panel is visible in FIG. 4.

The display panel of the module 91 makes the test results and other conditions visible to the operator. The panel has five windows 121 through 125 which permit the display of ten different values as follows:
Left front—pounds
Right front —pounds
Left rear—pounds
Right rear—pounds
Total—pounds
when an "UPPER" push button 126 is depressed. When the "LOWER" button 127 is depressed, the following values will be displayed in the five windows 121 through 125.
Front difference—%
Rear difference—%
Front/total—%
Speed—MPH
Total/weight—%
Whether pound or percentage values are being presented will be indicated by the small lamps (LED's) 128 and 129 located at the upper left and lower left corners of each of the windows. In addition, lamps labelled "READY," "PASS," "MARGINAL," and "FAIL" are also included to display the results of a given test.

Each of the digits appearing in the five windows is comprised of seven segments or bars which when selectively illuminated can represent the digits 0 through 9. Such digital displays are conventional and commercially available. Located on the display panel are two additional manually operable push button switches 130 and 131 labelled "AUTO" and "RESET", the functions of which will be explained further hereinbelow.

The manner in which the information is displayed on the windows, as well as the function of the various push button switches will be described in more detail later in connection with the description of FIGS. 5a and 5b.

Figure 5B:
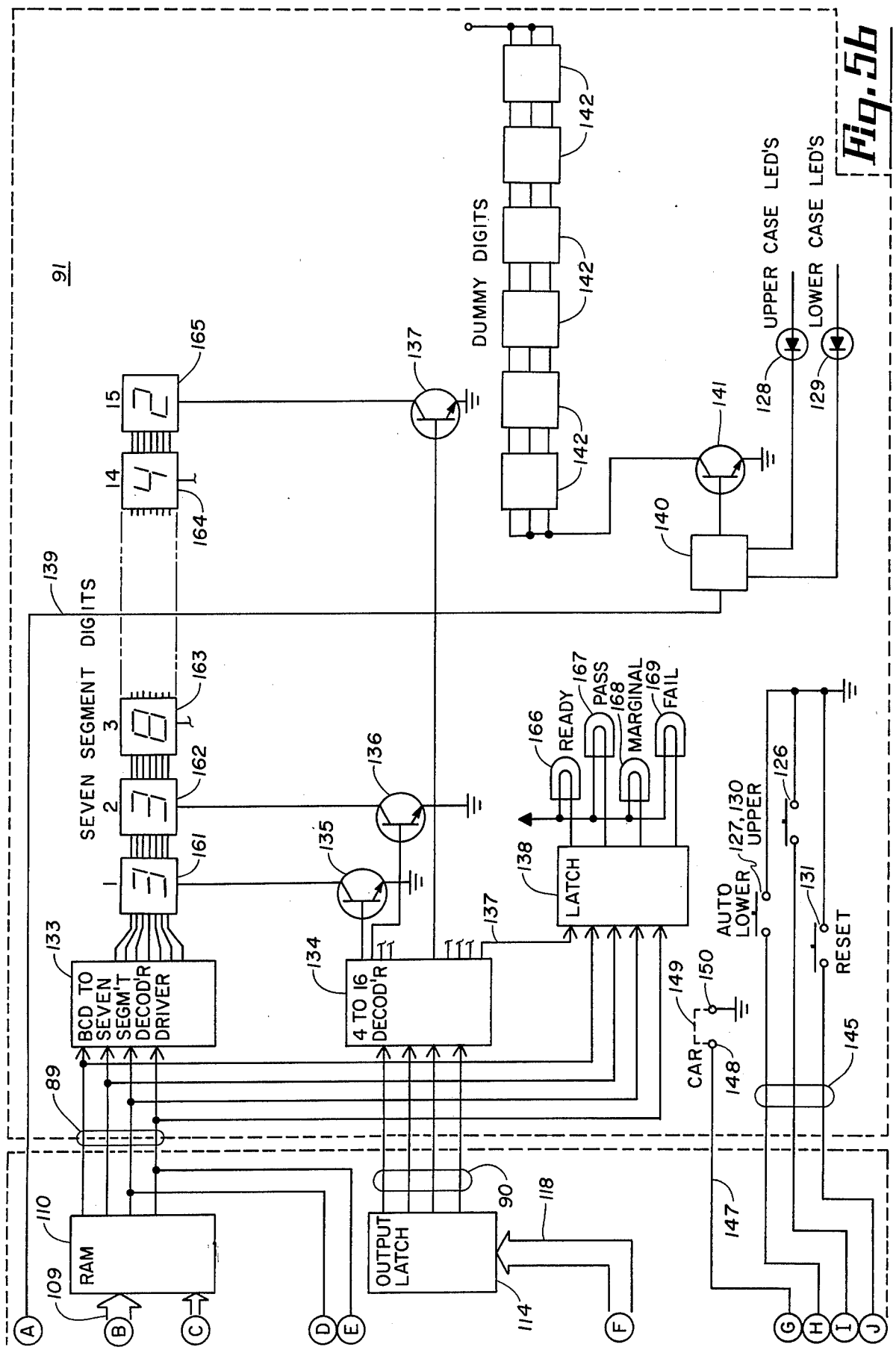

Referring to FIGS. 5a and 5b, there is shown by means of a logic block diagram the details of the signal processor 62, the microprocessor 85 and the display subsystem 91 used in the preferred embodiment of the present invention. Indicated generally by the numeral 92 are the plurality of linear variable differential transformers 54, 63, 64 and 65, previously described. As also previously described, the primary winding 67 of each of the LVDT's 54, 63, 64 and 65 is connected in parallel to the output of an oscillator which is here shown as an oscillator 93 which, as previously explained, may be a sinusoidal oscillator designed to produce an oscillating signal at the rate of 2500 Hz. The energization of the windings results in an amplitude modulated voltage being developed across the output terminals of the secondary windings 68 and 69 of the LVDT's, the amplitude of which is a direct function of the force induced displacement of the core 66.

The output from each of the LVDT's is coupled to the input terminals of a set of conditioning circuits 94, 95, 96 and 97, there being one such conditioning circuit associated with each of the LVDT's and therefore with each wheel of the vehicle to be tested. Each of the conditioning circuits comprises a full wave rectifier and low-pass filter network of conventional design. The components of the filter network are designed so as to present a high impedance to the signals from the oscillator 93 and, hence, acts as a detector for removing the 2500 Hz carrier and leaving only the time varying envelope corresponding to the modulation of the carrier signal resulting from flexure of the cross beam.

FIG. 6 illustrates a typical wave form resulting at the output of the conditioning circuits 94 through 97. At $t=0$ the vehicle is driven on to the tread plates 12 through 15 and the brakes are applied. After about one second, the voltage output from the conditioning circuit reaches its peak value and after approximately two seconds the voltage again drops to its near zero now value. Since the LVDT's are initially calibrated and produce a linear output, the voltage output from the conditioning circuits may be considered to be proportional to the applied braking forces.

The output voltage signals from the four conditioning circuits 94 through 97 are applied as inputs to a four channel analog multiplexer 98. Also connected to the multiplexer 98 are first and second input lines 99 and 100 which may be termed "channel select" lines. Depending upon the permutation of the binary signals applied to the channel select lines 99 and 100, one of the four input channels will be selected and the voltage signal appearing thereon will be passed through the multiplexer 98 to an analog to digital (A/D) converter 101 by way of the conductor 102. The A/D converter 101 operates in a conventional fashion to develop a binary code output on the data output lines 84 emanating therefrom. The binary code developed on the output lines 84 will be proportional to the instantaneous amplitude of the input signal appearing on conductor 102 at the time that the signal is sampled. As will become more apparent when the details of the microprocessor 85 are explained, the microprocessor is structured on a 4-bit byte data bus. The A/D converter 101 provides a 10 bit digital output to assure the requisite degree of resolution of the binary coded output to the analog input. As such, it is necessary to split the 10 bit parallel output from the A/D converter 101 into three, 4-bit bytes for transmission to the microporcessor. Accordingly, included within the A/D converter is a multiplexer (not shown) which receives the 10 data bits from the converter network and which, under control of the binary data on the "data select" lines 103 in the control cable 83, presents 4-bit bytes to the output lines 84. The "start" input line 104 provides the means whereby the operation of the A/D converter 104 is under the control of the program contained in the microprocessor. More will be said about this aspect when the details of the operation are explained.

The microprocessor module 85 includes a central processor unit (CPU 105) whose operation is under control of a digital clock 106. The operations performed by the CPU 105 are determined by the program stored in a programmable read only memory (PROM) 107. A memory interface circuit 108 is disposed between the PROM 107 and the central processor unit 105. Communication between the memory interface 108 and the CPU 105 is by way of a 4 bit bi-directional data bus 109. Also coupled to the data bus 109 is a random access memory (RAM) 110. In addition to serving as the interface between the PROM 107 and the CPU 105, the memory interface 108 also provides a portal through which data and control signals from an input latch 111 and output latches 112, 113 and 114 may pass.

The input latch 111 is coupled to the output lines 84 of the A/D converter 101 and serves to temporarily store one of the three 4-bit bytes comprising the digitized representation of the input analog waveform appearing on the input line 102 to the converter 101. The output from the input latch 111 is conveyed over the bus 115 to the memory interface unit 108. The output latches 112, 113 and 114 are respectively coupled to the memory interface unit 108 by means of busses 116, 117 and 118. Memory addresses for selecting words from the PROM 107 pass through the memory interface unit 108 and to the PROM by way of address bus 119. Instructions comprising the program for the CPU 105 and constants used in carrying out the program are transferred from the PROM 107 to the memory interface unit 108 by way of the instruction bus 120. A dash line box identifies the display module 91.

A 4-bit binary coded decimal word is applied over the bus 89 to the input lines of a BCD (binary coded decimal) to seven segment decoder driver circuit 133. The digits in the least significant digit position of windows 121–124 are wired to be all zeros when upper case information is being displayed. In addition, the next to the least significant digit position in the window 125 also is permanently wired to be a zero. When lower case information i. e., the percentages and vehicle speed is being displayed, these aforementioned zero positions are blanked out and no digits are displayed in these positions. Thus, there remains in the overall display 15 digit positions where any of the digits 0 through 9 may be presented. The BCD to seven segment decoder driver circuit 133 is coupled to these 15 seven segment display units, only five of which are shown and designated by the reference characters 161, 162, 163, 164 and 165. The code applied to the driver by way of input lines 89 determines which of the seven bars in each display unit will be illuminated in forming a given digit.

Also forming part of the display circuitry is a four to 16 decoder 134. This decoder receives as its inputs 4 bits from the output latch 114 by way of the lines 90. Each of the associated sixteen output lines from the decoder 134 is coupled to the base electrode of a transistor switch, such as switches 135, 136 and 137 which are each connected to one of the digit display units 161 through 165. When one of these switches is rendered conductive, its associated seven segment display is coupled through the collector to emitter path to ground to thereby allow illumination in the associated display unit of the bars comprising the digit as determined by the output from the decoder driver 133. When in the display mode, the code appearing at the input to the four to sixteen decoder 134 assumes all of the 16 possible binary combinations of 4 bits to energize the associated transistor switches 135, 136, et cetera at a rate which is sufficiently high so that a flicker free presentation results. A 60 Hz rate has been found acceptable. It is to be noted that the sixteenth line out of the decoder 134 is coupled by conductor 137 to an input of a latch 138 so that when this line is enabled by the appropriate code appearing on conductors 90, the latch 138 will be enabled and one of the indicator lamps READY, PASS, MARGINAL, and FAIL, designated by reference numerals 166, 167, 168 and 169 will be energized depending upon the code appearing at that time on the output lines 89 from the RAM 110.

As mentioned earlier, when upper case information is being displayed in the windows, certain of the digit positions are forced to represent the digit 0. To accomplish this result, a control line 139 is coupled from the output of the latch 113 to a buffer circuit 140 which controls the conduction state of a driver transistor 141. When the transistor 141 is rendered conductive, the six dummy zero digits 142 will be illuminated. The buffer logic circuit 140 also controls the illumination of the upper case and lower case LED indicators 128 and 129 which appear at the upper left and lower left corners of each of the five windows.

The electronic module of the computerized pad brake tester and analyzer of this invention also includes means for determining the speed of the vehicle as it is driven onto the tread plates and before the brakes are applied. First and second pressure sensitive switches 29 and 30 are located between the fron and rear tread plates, as was explained in connection with FIGS. 1 and 2, and are positioned a predetermined distance apart from one another. A vehicle, when driven on to the tread plates, has one front wheel first crossing the first pressure sensitive switch 29 which turns on a trigger circuit in a speed detector circuit 143 and when this front wheel passes over the second pressure sensitive switch 30, the speed detector circuit 143 is turned off. The number of fixed increments of time which have elapsed between the turning on and turning off of the detector 143 determines the total time taken for the vehicle to traverse the known distance. From this information it is possible to compute the vehicle's speed in miles per hour.

The output from the detector 143 is applied to a 8 to 1 multiplexer circuit 144. Other inputs to the multiplexer circuit 144 arrive by way of lines 145 in cable 89 (FIG. 4) coming from the manually operable push buttons 126, 127, 130 and 131. Depending upon the state of these push buttons when they are sampled, an indication is given to the CPU 105 by way of the output line 146 from the multiplexer 144. The CPU 105 uses the output of the speed detector circuit 143 to calculate the speed of the vehicle.

Another line 147 connects a terminal 148 to the input of the multiplexer 144. At the time of manufacture, a conductive jumper 149 is included between the terminal 148 and a grounded terminal 150 so that line 147 is normally grounded. If the computerized brake tester and analyzer of this invention is to be used in testing the brakes on truck type vehicles, the jumper 149 is broken or removed. However, if it is to be used to test the brakes on automobile type vehicles, the jumper 149 is left intact. The multiplexer 144 has two additional input terminals 151 and 152 which may be selectively connected to grounded terminals 153 and 154 by conductive jumpers. By selectively severing neither, one, the other, or both of the jumpers between terminals 151 and 153 and terminals 152 and 154 it is possible to indicate four different binary codes. These codes are recognized by the CPU 105 as the pass/fail criteria established by different state or local governments.

Now that the details of the construction of the electronic circuitry has been presented, consideration will now be given to the mode of operation.

OPERATION

To begin operation, the "POWER ON" push button 155 (FIG. 4) is depressed which has the effect of applying 115 volt ac power to the analyzer unit. The analyzer automatically enters a lamp test routine and the left front, left rear, right front and right rear windows 121, 123, 122 and 124 will read 8880 while the total window 125 will read 88800. The status indicators 167, 168 and 169 PASS, MARGINAL and FAIL, respectively, and the pounds indicator lamps 129 will aslo be illuminated. Next, the operator momentarily depresses the RESET push button 131. With this switch closed, a ground condition is applied to the 8 to 1 multiplexer 144. A program starting address is loaded into the stack register of the CPU 105 to initiate the execution of a subroutine stored in the PROM 107. Specifically, an address for the PROM 107 is inserted by way of the memory interface unit 108 by way of bus 119 which effects a readout of a previously stored code word from the PROM 107 by way of the bus 120. Gates are enabled to cause this code word to pass by way of bus 116 to the output latch 112. The contents of the output latch 112 when applied to the multiplexer 144 cause it to sample the grounded lead in the cable 145 and this condition is conveyed to the CPU 105 by way of conductor 146. Once this ground condition is sampled by the CPU, a predetermined operand is fetched from the PROM 107 and it passes through the memory interface unit 108 and the bidirectional data bus 109 to the RAM 110. Once this particular code is stored in RAM 110 it becomes available to the latch 138 and when the latch is enabled by a signal on line 137, the code causes the READY Indicator 166 to be lit and the PASS, MAR-GINAL and FAIL indicator 167, 168 and 169 to be extinguished. Next, the operator depresses the UPPER push button switch 126 and again, the ground condition on this line passes through the multiplexer 144 to the CPU. The CPU responds to this condition by again addressing another instruction or operand from the PROM 105. If the display subsystem is operating properly, all of the panel lamps should light with the exception of the "percentage" and "MPH" indicator lamps 129 at the test windows (FIG. 4). Also, the left front, left rear, right front, and right rear windows 131, 123, 122 and 124 should read 8880 while the total window 125 should read 88800. Next the operator depresses the LOWER push button 127 and again this condition is sampled by the CPU 105 by way of the 8 to 1 multiplexer 144 to cause a readout of an appropriate prestored value from the PROM 107 which will cause the driver 133 and decoder 114 to present all zeros in all of the test windows and to cause the Percentage and MPH indicator lamps 129 to light.

As a final step in the display test procedure preparatory to performing brake analysis, the operator depresses the AUTO push button 130 which causes both the LOWER switch 127 and the UPPER switch 126 to be opened. The resulting open condition on two of the three lines contained in cable 89 is sequentially sampled by the CPU 105 by way of the 8 to 1 multiplexer 144 and, again, an operand is read out from the PROM 107 via the memory interface unit 108 to the output latch 114 and the RAM 110. The particular code value, so obtained, when applied to the display subsystem by way of cables 89 and 90 causes the test window readings to be blanked out. If the foregoing sequence of manual operation of the push buttons 126, 127, 130 and 131 result in the above described events taking place, the operator is assured of proper display operation and can proceed to perform brake analyses on vehicles.

AUTOMATIC TEST MODE

When the AUTO push button 130 is depressed, both switches 126 and 127 are closed. This programs the analyzer to automatically first display the lower case i. e., the readings, percentages of the pounds of braking force, the vehicle test speed in miles per hour and then the upper case readings, i. e., the pounds of braking force. Before an automobile is driven on to the tread plates 12-13, the analyzer is in a standby condition and the READY lamp is illuminated. The vehicle to be tested is next driven on to the tread plates until the front wheel cross both speed sensors 29 and 30 and then the brakes are applied. As the front wheel passes over the vehicle sensor switch 29, the operation of the speed detector circuit is initiated. When the front wheel of the vehicle crosses the second vehicle sensor switch 30, the detector 143 is shut off. The output from the speed detect circuit 143 is fed through a pair of input lines to the 8 to 1 multiplexer 144. Under program control, the output latch 112 is loaded with a code which, when translated, causes the speed indication to be entered via line 146 into the CPU 105 where the speed computation actually takes place. A code corresponding to this speed is stored temporarily in the RAM 110 where it becomes available to the display subsystem for visual presentation in the manner already described.

The sudden braking of the vehicle causes forces to be applied to the four tread plates and the amount of force resulting is detected by the four LVDT's 54, 63, 64 and 65. As has already been described, the rectifier and low pass filter circuits contained within the conditioning circuits 94, 95, 96 and 97 operate upon he signal outputs from the LVDT's to produce a time varying dc voltage which is proportional to the instantaneous force transmitted to the four tread plates. These four voltage wave forms similar to that illustrated in FIG. 6 are applied as inputs to the four channel analog multiplexer 98. Under control of the program stored in the PROM 107 and the CPU 105 causes the output latch 113 to be sequentially loaded with the code pattern 00, 01, 10, 11 on a sequential and repetitive basis. These bit permutations when applied to the multiplexer 98 by way of conductors 99 and 100, cause the voltage signals from the conditioning circuits 94 to be first fed through the multiplexer 98 by way of conductor 102 to the A/D converter 101.

The instantaneous value of voltage at the sampling time is converted to a binary code in the A/D converter 101 and this code is fed in three 4-bit bytes to the input latch 111 and from there to the memory interface unit 108 by way of the bus 115. Next, the voltage signal appearing at the output of conditioning circuit 95 is fed through the multiplexer 98 and converted to a digital code by the A/D converter 101 and from there fed into the processor subsection and the process is repeated for the voltage outputs from the conditioning circuits 96 and 97. Sampling occurs at a one millisecond rate so that after 4 milliseconds the multiplexer 98 is again sampling conditioning circuit 94. Thus, approximately every 4 milliseconds each of the conditioning circuits 94, 95, 96 and 97 has its output voltage sampled, digitized and stored away in the processor section. In FIG. 6, the vertical lines are intended to represent the sampling times of the output signals from the conditioning circuits.

With the data with respect to the vehicle's speed and the resulting brake forces from all four wheels available to the processor 105, the processor continues to execute the microinstructions stored in the PROM device 107 on a real time basis to individually compute the integral of the forces on all four wheels during the two second interval in which the braking forces are applied. Not only is the integrated value of the force computed and stored, but also the peak forces are recorded. Once these parameters, as well as the vehicle speed parameters, are stored in the RAM 110, the data becomes available for presentation to the operator by way of the display subsystem.

The pass/fail criteria are programmed into the unit by means of the presence or absence of jumpers between the State Code terminals 151–153 and 152–154. The presence or absence of a jumper is detected by the CPU 105 via the multiplexer 144 under control of a code entered into the output latch 112. Values corresponding to the criteria are stored in the PROM 107 and are sampled by the CPU 105 and a comparison is made between the stored values and the actual measurements. The comparison results in a binary coded decimal word being transmitted from the RAM 110 to the latch 138, and depending upon the results of the comparison, the pass lamp 167, the marginal lamp 168, or the fail lamp 169 will be lighted. If the marginal lamp 168 is lit, a retest of the vehicle is made. If the marginal lamp still lights after this second test, it indicates that the brakes are nearing failure, but still stopping the vehicle just within the state code selected pass/fail criteria specifications.

With the manual push button 130 in the AUTO position, the lower case information, i.e., the percentage values and speed in miles per hour, is displayed for a period of ten seconds in the appropriate windows corresponding to the indicated readings. At the end of this ten second interval, the percentage values and speed reading will turn off and a presentation will be made of the upper case information, i.e., the pounds of braking force and the total pounds of braking force will be displayed in the test windows.

If it should happen that the percentage readings and speed readings turn off and the pounds of braking force are displayed before the operator has had a chance to record the first readings, he can recall these readings into the displays by depressing the LOWER push button 127 to again call the previously stored values from the RAM 110 and display the percentage and speed readings. Similarly, if the operator pushes the UPPER push button 126, he can continuously display the force readings. Or, the operatore may then again depress the AUTO push button 130 which will cause the display of the pounds of force (upper case) information again.

Next in the sequence of events, the vehicle is driven off from the tread plates As the wheels cross the vehicle pressure sensors 29 and 30, signals are fed through the multiplexer 144 to the CPU 105 causing the analyzer to automatically be programmed for the next vehicle test. At this time, the Ready lamp 166 will again be lighted and all of the previous test readings presented in the windows will be turned off. At this time, and before the next vehicle drives on to the tread plates, the operator may still recall and display the previous readings by pressing the LOWER push button 127 to display the percentage and speed readings, pressing the UPPER push button 126 to display the pounds of braking force test readings and depressing the AUTO push button 130 to return the analyzer to the automatic test mode program.

This completes the description of the operation when the analyzer is in its "AUTOMATIC" mode.

UPPER OR LOWER TEST MODE

When the UPPER push button 126 on the control panel 91 is depressed, this condition is sensed by the CPU 105 when the multiplexer 144 is made to scan the grounded line in the cable 145 associated with the now-closed UPPER push button switch. Upon sensing this condition, the CPU is forced to jump to a subroutine stored in the PROM 107 such that before an automobile is driven on to the tread plates, the READY indicator lamp 166 is lit. Now, when a vehicle is driven on to the tread plates and the front wheels cross the center plate 27 on which the speed sensors 29 and 30 are positioned, a computation will be made as to the speed of the vehicle in the manner already described. After the front wheels cross both speed sensors, the driver operates the brakes and the braking forces are picked up by the LVDT's, passed through the conditioning circuits 94 through 97 and the analog multiplexer 98 to the A/D converter 101 where the analog voltages proportional to the force on each wheel is converted to a 10 bit binary code and passed by way of the input latch 111 and the memory interface 108 to the CPU 105. This input data is processed in accordance with programs stored in the PROM 107 and the resulting processed data is stored away in the RAM 110. Once the process data is in the RAM 110 it may be addressed in a desired fashion and read out to the indicator lamp decoder and driver network 133. Depending upon the comparison between the test criteria established by the state code jumpers connected to the terminals 151 and 152, one or another of the pass, marginal or fail indicator lamps will be illuminated and the Ready lamp 166 will be extinguished.

When the analyzer is in its UPPER mode and the vehicle is driven off from the tread plates following the testing operation, the analyzer automatically detects this situation and jumps back to the programs for testing the next vehicle. When either the UPPER or LOWER test mode is used for brake testing, the resulting readings will remain displayed in the windows and the pass, marginal or fail result lamp will remain on even after the vehicle has left the tread plates and the ready lamp 166 has again been illuminated. These test readings and test result lamps will automatically turn off when the next vehicle to be tested is driven on to the tread plates for a brake test.

SYSTEM COMPONENTS

In the preferred embodiment of the present invention, all of the components represented in the logical block diagram are commercially available parts. The following table provides an indication of exemplary devices which may be used to implement the front end module, the processing module and the display module.

| Device | Type | Source |
| --- | --- | --- |
| Analog Mux. 98 | Am 3705 | National Semiconductor Inc. |
| A/D Converter 101 | AD 7570 | Analog Devices, Inc. |
| Output Latch 112, 113 & 114 | 3404 | Intel Corp. |
| Multiplexer 144 | 75151 | Texas Instruments |
| PROM 107 | 2708/2704 | Intel Corp. |
| Mem. Interface 108 | 4289 | Intel Corp. |
| CPU 105 | 4040 | Intel Corp. |
| Clock 106 | 4201 | Intel Corp. |
| RAM 110 | 4002-1 | Intel Corp. |
| (BCD-to-7 Segment (Decoder Driver 133 | 7447 | Intel Corp. |
| Decoder 134 | 7442 | National Semiconductor Inc. |
| Latch 138 | 74195 | National Semiconductor Inc. |

It is to be understood that the devices in the foregoing table have been used in implementing the preferred embodiment. However, persons skilled in the art would be able to practice the invention by using other devices than those indicated and accorrdingly, limitation to the use of the foregoing suggested devices is not intended and should not be inferred.

One desiring further information on the construction of the Intel 4040 CPU and the manner of programming same may refer to a publication entitled "Intel MCS-40 User's Manual For Logic Designers" Second Edition, copyrighted 1975 by Intel Corp. This manual sets forth the instruction repertoire for the 4040 Processor as well as the manner for interconnecting the CPU with its associated PROM and RAM by way of a bidirectional data bus.

While it is not deemed necessary to set forth the detailed program coding as it is contained in the PROM 107, it may be helpful in understanding the operation of the analyzer to provide an indication of the calculations performed. A person of ordinary skill familiar with the Intel 4040 microprogrammable computer should be able to construct any number of instruction sequences (programs) for performing these calculations.

As has been mentioned, the speed of the vehicle prior to application of the brakes as it is driven on to the tread plates is determined by measuring the time elapsed in driving the known distance between the pressure sensitive switches 29 and 30. The time between switch activation is measured as n intervals of fixed length t. The following equation defines the vehicle speed S.

$$S = \frac{d}{12 \text{ in/ft} \times 5280 \text{ ft/mi}} \Big/ \frac{n \Delta t \text{ ms}}{1000 \text{ ms/sec} \times 3600 \text{ sec/hr}}$$

where $d$ = distance between pressure sensors in inches, and $\Delta t$ = time unit in milliseconds.

$$S = \frac{K_s}{n} \text{ mph, where } K_s = \frac{1{,}000 \times 3600 \times d}{12 \times 5280 \times \Delta t} = 56.82 \frac{d}{\Delta t}$$

The force exerted by each wheel on its respective tread plates is computed as follows:

Force = C (V−Z) × 10 lbs.

Where C = scale factor: 2 lb/unit for truck model or 1 lb/unit for car model,

V = peak voltage during 2 second braking interval, and

Z = zero force voltage = one-fourth full scale.

The reason for the difference in scale factor for truck models and car models is that a different elastic beam 40 is employed where truck models are to be used. For the same braking force, the elastic beam 40 employed for trucks will deflect only half as far as that employed for ordinary automotive vehicles. Since the display units for windows 121 through 124 are only designed to indicate a total braking force of 9,990 pounds and that for window 125 a total braking force of 99,900, the program is designed so that the maximum forces displayed are less than those values to prevent an incorrect indication from the apparatus if some heavy vehicle were driven on to the tread plates.

The weight of the vehicle is computed as follows:

$$W = g/S \sum_{i=1}^{N} F_i \Delta t \text{ where}$$

$g$ = acceleration of gravity = 32.174 ft/sec$^2$, $F_i$ = C $V_i$ × 10 lbs., $\Delta t$ = sampling interval in $ms$, and N = number of samples in braking interval.

Thus $$W = \frac{32.174 \times 3600}{5280} \text{ mi/hr sec} \frac{n}{K_s \text{ mi/hr}} C \text{ 10 lbs} \sum_{i=1}^{N} (V_i - z) \frac{t \text{ sec}}{1{,}000}$$

and $$W = K_w n \sum_{i=1}^{4} (V - Z) \text{ 10 lbs.}$$

where $$K_{v} = \frac{32.174 \times 3600 \times C \times \Delta t}{5280 \, K_s \times 1000} = .02194 \frac{C\Delta t}{K_s}$$

in which
$V_i$ = sum of voltage samples for 4 wheels,
Z = sum of zero force voltages, which are adjusted to equal on fourth of the value of the voltages for full deflection of the elastic beam 40.

In making the above computation the computer is programmed to disregard any voltage samples corresponding to a braking force of less than 100 pounds since such small forces may be unrelated to the braking effort.

The percentage values displayed are computed in accordance with the following equations.

$$\% \text{ Front difference} = \frac{(F_0 - F_1)}{\max(F_0, F_1)} \times 100$$

$$\% \text{ Rear difference} = \frac{(F_2 - F_3)}{\max(F_2, F_3)} \times 100$$

$$\% \text{ Front/total} = \frac{F_0 + F_1}{F_0 + F_1 + F_2 + F_3} \times 100$$

$$\% \text{ Total/weight} = \frac{F_0 + F_1 + F_2 + F_3}{W} \times 100$$

where
$F_0$ = Right front force × 10 lbs.
$F_1$ = Left front force × 10 lbs.
$F_2$ = Right rear force × 10 lbs.
$F_3$ = Left rear force × 10 lbs.
W = total weight × 10 lbs.

$$\text{"Total pounds" Display} = \frac{F_1 + F_2 + F_3 + F_4}{10} = 100 \text{ lbs.}$$

CONCLUSION

It will be seen that we have provided a new and novel brake tester in which a great variety of information with regard to the tests is quickly displayed on a convenient display panel. By reason of the fact that the equipment employs an electronic computer, it is possible to determine the weight of the vehicle without a separate weighing operation. Because of the use of electronic digital processing equipment, it is possible to locate the display panel at any conveninet location with the assurance that the results of the various measurements will be very quickly displayed on the panel.

While we have shown a specific embodiment of our invention for purposes of illustration, it is to be understood that the scope of the invention is limited solely by that of the appended claims.

We claim:
1. Vehicle brake testing apparatus comprising:
two pairs of tread plates upon which wheels of the vehicle are to be driven and stopped by braking, there being one pair of tread plates for the front wheels and one for the rear wheels,
means for mounting each tread plate for longitudinal movmement independently of the other tread plates,
means connected to each tread plate for producing an electrical signal dependent in value upon the braking force on the wheel engaging the tread plate,
means for producing a total braking force signal dependent upon the sum of the electrical signals produced by each of said last mentioned means,
means for integrating the total braking force over the major portion of its duration,
means secured adjacent said tread plates for measuring the velocity of the vehicle as it is driven on to said tread plates and producing an electrical speed signal dependent upon the speed of the vehicle,
means for dividing the integrated total force signal by the speed signal to obtain a weight signal indicative of the weight of the vehicle, and
means for comparing the total force signal with the weight signal to obtain an indication of the ratio between the total braking force and the weight of the vehicle.

2. The vehicle brake testing apparatus of claim 1 in which the pairs of tread plates are longitudinally spaced apart to provide an intermediate area between said pairs of plates and in which said velocity measuring means is located in said intermediate area.

3. The vehicle brake testing apparatus of claim 2 in which the means for producing the electrical signals dependent in value upon the braking force on the wheels are located in said intermediate area between the inner ends of the pairs of tread plates.

4. The vehicle brake testing apparatus of claim 1 in which there is a means to indicate whether the ratio between the total braking force and the weight of the vehicle exceeds or is below an accepted standard.

5. The brake tester of claim 1 in which there is a display panel containing electronic display elements capable of being selectively energized to display various numerals and in which the electronic display elements are selectively energized to indicate the speed of the vehicle, the weight of the vehicle, and the ratio of the total braking force to the weight of the vehicle.

6. Vehicle brake testing apparatus comprising:
two pairs of tread plates upon which wheels of the vehicle are to be driven and stopped by braking, there being one pair of tread plates for the front wheels and one for the rear wheels,
means for mounting each tread plate for longitudinal movement independently of the other tread plates,
means connected to each tread plate for producing an analog electrical braking signal dependent in value upon the braking force on the wheel engaging the tread plate,
means for converting the analog signals to corresponding digital signals,
digital computing means for computing the values of various relations between the values of the various digital signals corresponding to said analog signals,
and digital display means having electronic display elements and means selectively energizing said display elements to indicate digitally the values of said various relations.

7. The vehicle brake testing apparatus of claim 6 in which one of the values of the relations being displayed is the value of the ratio between the difference in the front wheel braking signals produced by actuation of the tread plates for the front wheels and the magnitude of one of said front wheel braking signals.

8. The vehicle brake testing apparatus of claim 7 in which the one of said front wheel braking signals is the maximum of the two front wheel braking signals.

9. The vehicle brake testing apparatus of claim 6 in which one of the values of the relations being displayed is the ratio between the difference in the rear wheel braking signals produced by actuation of the tread plates for the rear wheels and the mangitude of one of said front wheel braking signals.

10. The vehicle brake testing apparatus of cliam 6 in which one of the values of the relations being displayed is the value of the relation between the total of the front wheel braking signals and the total of the braking signals of all four wheels.

* * * * *